May 10, 1966 J. SIMON 3,251,054
ANALOG-TO-DIGITAL ENCODER
Original Filed Feb. 5, 1959

INVENTOR
JOSEPH SIMON
BY

ATTORNEY 3,251,054

ANALOG-TO-DIGITAL ENCODER

Joseph Simon, North Hollywood, Calif., assignor to General Precision, Inc., a corporation of Delaware
Continuation of application Ser. No. 791,430, Feb. 5, 1959. This application Jan. 28, 1963, Ser. No. 254,397
6 Claims. (Cl. 340—347)

This invention relates to analog-to-digital encoders, and more particularly to a new and improved variable reluctance shaft position to digital encoder.

This is a continuing application of co-pending application, S.N. 791,430, filed on February 5, 1959, now abandoned.

The term "encoder," as spoken of in this application, includes devices for converting a quantity into coded information that represents that quantity and which may be used as an input into digital computers. The particular encoder embodying this invention converts the angular position of a rotatable shaft into digital machine language, such as a standard binary code which will represent in binary language the instantaneous position of the rotatable shaft.

Most of the analog-to-digital encoders use an information member which is in the form of a disk that is divided into several concentric tarcks with each track being coded in some form to represent successive digits. The output signals obtained from each of the different concentric tracks at any instant are dependent upon the angular position of an input shaft driving the disk. Heretofore, encoders using disks could in general be divided into two major categories; one employing electrical conducting brushes in contact with each concentric track which has coded conducting and insulating segments, and the other employing magnetic or photocell techniques. The latter types have distinct advantages in that they are capable of longer life because of the absence of brush wear, and they are capable of higher speeds of rotation because of the absence of brush bounce over irregularities that may be present on the surface of the concentric tracks of the coded disk.

In general, encoders of the photocell or magnetic type, while they have the advantage of longer life and higher speed, have a serious disadvantage of low output and poor resolution. Specifically, the output signal obtained in this type of encoder is such that it is difficult, and often impossible from a practical standpoint, to accurately detect any difference in signal amplitude as the encoder is rotated. In the photocell type of encoder, the photocell is unable to accurately detect the edge of a coded segment, such as a transparent segment on the concentric track of a rotatable disk. In the conventional magnetic type of encoder the signal to noise ratio in the output is so low that it is often impossible to detect the various coded segments in the concentric track of the disk.

In the present invention an encoder of the magnetic type is provided which is capable of shaft speeds of thousands of revolutions per minute, and which provides a high signal to noise ratio output signal that sharply defines each of the coded segments on the concentric tracks of the coded information member or disk which is driven by the input shaft. The disk itself is provided with a suitable number of concentric tracks, each of which is coded by a suitable code by etching raised and recessed segments in the concentric track. A sensing member, or head, is positioned over each concentric track and is provided with a thin section, or finger, and an elongated shoe, or flux return section. Both the disk and the head are made of a high permeability material, such as ferrite, that can readily conduct magnetic flux.

A single electrical winding encircling the finger of the head is excited with a high frequency to generate a flow of flux through the finger, through the raised or recessed segment, into the coded disk and thence through the shoe section of the head to complete the magnetic path. As the raised and recessed segments of the concentric track of the disk are passed beneath the head, the raised and recessed segments will provide a small and large air gap, respectively, to vary the reluctance to the magnetic circuit. This variation in reluctance is detected by the same coil that produces the flow of magnetic flux.

The output produced as the encoder disk is rotated gives a clear reproduction of the particular code on the disk. This output, however, does have a relatively low signal to noise ratio which in certain circumstances may be considered objectionable. This output signal is improved by placing a sensing member, or head, over a concentric reference track which is not coded, i.e., either completely raised or completely recessed without coded segments. The output from this uncoded reference track will provide a signal which may be considered as noise, and which, when subtracted from the output signals of the other coded tracks, will yield output signals from the coded tracks that sharply define the particular code and which have a very high signal-to-noise ratio.

One object of this invention is to provide a variable reluctance encoder in which the variation in reluctance is accomplished by raised and recessed coded segments in each concentric track of the input disk.

Another object of this invention is to provide a variable reluctance encoder in which a single coil serves the dual function of producing magnetic flux and detecting variations in reluctance.

A further object of this invention is to provide a variable reluctance encoder having an output signal having a very high signal-to-noise ratio.

Other objects and advantages of this invention will become apparent from the following specification and figures in which.

Figure 4A:
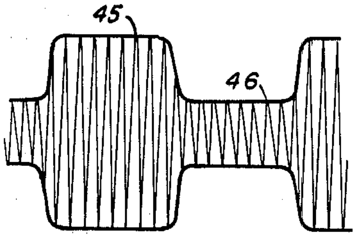
Figure 4B:
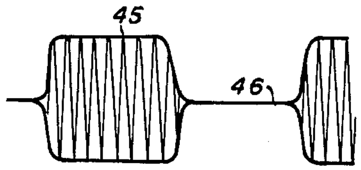

FIGURE 4*a* is one type of waveforms of the output signals of the encoder embodying this invention; and FIGURE 4*b* is a typical waveform after being clipped.

Figure 1:
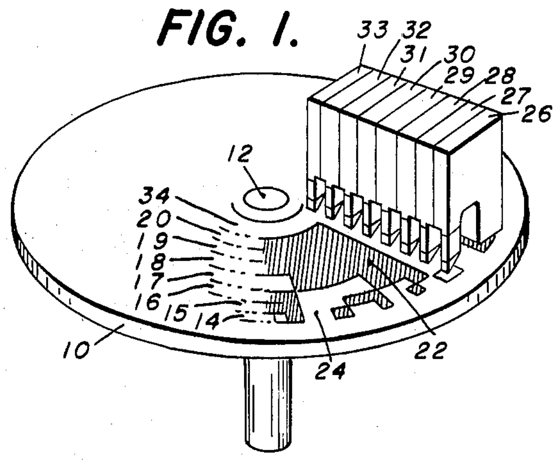
FIGURE 1 is a perspective view of the information sensing heads and the reluctance varying disk or information member of the encoder embodying this invention.

Turning now to a detailed description of one embodiment of this invention, FIGURE 1 illustrates a coded information member or disk 10, which is mounted on a rotatable shaft 12. Disk 10, which is constructed of a magnetic material having a high permeability, such as ferrite, may have, for example, seven concentric tracks, 14 through 20, each of which may contain raised and recessed segments arranged to form a code, such as the binary digital code shown in FIGURE 1. The recessed segments are shaded in FIGURE 1, and are designated generally as 22, while the raised or surface segments are designated by numeral 24.

Radially aligned over the surface of disk 10, and in close proximity thereto, are eight sensing members or heads, 26 through 33 forming a U-shaped block, positioned so that each head is adjacent each coded concentric track on the surface of disk 10. It is to be noted that head 33 is adjacent an uncoded concentric track which is designated as reference track 34, and which will be subsequently explained in detail.

Figure 2:
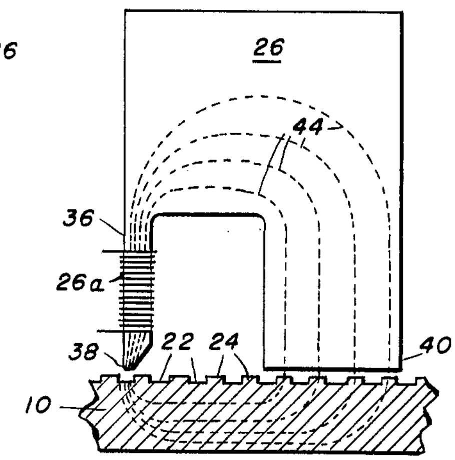
FIGURE 2 is an enlarged side elevation view of an information sensing head, together with a partial sectional view of the reluctance varying rotatable input disk.

All of heads 26 through 33 may be identical in size and configuration; therefore, in order to better explain the operation of the invention head 26 together with a portion of disk 10 showing the raised segments 24 and recessed segments 22 have been illustrated in FIGURE 2. Head 26 is provided with a sensing section or finger 36, the end of which is tapered so that only a small surface or sensing point 38 remains. The surface remaining at sensing point 38 is dependent upon the width of concentric track 14 and the angular length of each coded segment in that track. In order to attain maximum resolution, sensing point 38 should be approximately one quarter the angular length of raised and recessed segments 24 and 22. In order to reduce the possibility of cross talk between heads over adjacent tracks, sensing point 38 should be narrower than the radial width of each concentric track.

Head 26 is provided with a return section or shoe 40 which should be sufficiently long so that it is adjacent at least two of the raised segments 24 on disk 10. It is not necessary that the return section or shoe 40 be adjacent only its respective concentric track, and it is permissible for portions of shoe 40 to extend over adjacent concentric tracks.

Figure 3:
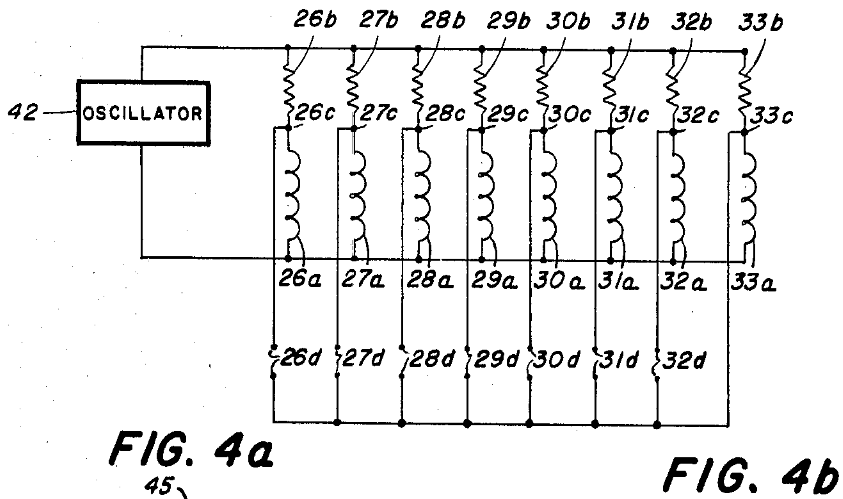
FIGURE 3 is a partial circuit representation of the variable reluctance encoder embodying this invention.

Finger 36 on head 26 supports a single winding 26a which may, for example, have approximately 100 turns of number 36 enameled wire. For convenience, each winding on each finger will have the same designation as its sensing member, or head, followed by the letter "*a*." Winding 26a will therefore be supported by the finger on head 26, winding 27a will be supported by the finger on head 27, etc. Winding 26a, and all other windings, may be connected through series resistances to an oscillator 42, as shown in FIGURE 3. Oscillator 42 may provide a signal of 240 kilocycles at a peak-to-peak voltage of approximately 13 volts. Winding 26a will thereby produce a magnetic field, or flux path 44, as shown in FIGURE 2. Since the material of head 26 and disk 10 is a high permeability material the flux generated by winding 26a will flow through sensing point 38, into disk 10, into return section or shoe 40, through head 26, and into finger 36 to complete the circuit.

It is highly desirable that the bottom surfaces of sensing point 38 and shoe 40 be as close as possible to the surface or raised segments 24 of disk 10 so that the air gap between head 26 and the surface of disk 10 is at a minimum. If recessed segments 22 of disk 10 are etched to a depth of 0.005 inch below the raised segments 24, and if sensing point 38 and shoe 40 are spaced 0.0005 inch from the raised segments 24 of disk 10, an air gap of 0.0055 inch will result between sensing point 38 and recessed segments 22 when sensing point 38 is positioned over a recessed segment 22. As disk 10 is rotated with respect to head 26 the air gap under sensing point 38 will be varied in accordance with the particular code etched into disk 10. This increasing and decreasing air gap causes a corresponding increasing and decreasing reluctance to the magnetic circuit.

When reluctance in a magnetic circuit is varied the flux in the circuit is correspondingly varied. Therefore when sensing point 38 is adjacent a recessed segment 22, the flux in the magnetic circuit passing through disk 10, shoe 40, head 26, and finger 36 is appreciably less than the flux existing when sensing point 38 is adjacent a raised segment 24. Since the inductance in winding 26a is directly proportional to the flux in the magnetic circuit, this inductance will be varied as sensing point 38 passes over the raised and recessed segments 22 and 24 respectively in the concentric track. When winding 26a is connected in series with resistance 26b as shown in FIGURE 3 and is excited with a high frequency signal from oscillator 42, the impedance of winding 26a will change with its inductance and the voltage drop across winding 26a will correspondingly vary. Thus it can be seen that both excitation of the magnetic circuit and detection of variation in reluctance can easily be accomplished with a single winding 26a on finger 36.

As shown in FIGURE 3, windings 26a through 33a are each connected in series with resistances 26b through 33b. Resistances 26b through 33b should be of a value approximately equal to the A.C. impedances of windings 26a through 33a. This value is, of course, dependent upon the operating frequency of oscillator 42, the permeability of the material in head 26 and disk 10, the number of turns in the windings, and the amount of air gap in the flux path 44. Resistance 26b and winding 26a form a series voltage divider circuit. When the air gap under sensing point 38 is small, i.e., when over a raised segment 24, the impedance in winding 26a is high and the corresponding voltage across the winding is high as represented by the high portion 45 in the typical output shown in FIGURE 4*a*. When sensing point 38 is over a recessed segment 22, the air gap is large, resulting in a lower impedance in winding 26a and a lower voltage across the winding as shown at 45 in FIGURE 4*b*.

As noted earlier, concentric track 34 is a reference track containing no coded segments. The sole purpose of reference track 34 is to generate within winding 33a on head 33 that is positioned over reference track 34 a constant signal which may be said to represent noise, and which is subtracted in the circuit of FIGURE 3 from the voltages appearing across windings 26a through 32a to achieve an output from each winding 26a through 32a that has a high signal-to-noise ratio, as shown in FIGURE 4*b*. The sensing point on the finger of head 33 should be spaced above the surface of reference track 34 the same distance as sensing point 38 is spaced above recessed segment 22, as shown in FIGURE 2. If reference track 34 is not recessed, then the finger on head 33 should be 0.005 inch shorter than all other fingers so that the sensing point is spaced 0.0055 inch above the surface of reference track 34. If desired, reference track 34 may be entirely recessed, in which case the finger on head 33 will be the same length as the fingers on heads 26 through 32. Because the air gap between the sensing point of head 33 and the surface of reference track 34 is the same as the air gap between sensing point 38 and recessed segment 22 of FIGURE 2, the voltage across winding 33a of head 33 will always be equal to the voltage across winding 26a when sensing point 38 is over a recessed segment 22. As can be seen in FIGURE 3, each of the voltages across windings 26a through 32a is compared with the constant noise voltage appearing across winding 33a. For example, the voltage across winding 26a may be determined at point 26c of FIGURE 3. The voltage across winding 26a may appear as shown in FIGURE 4*a*. By comparing the voltage appearing at point 26c with the constant noise voltage appearing at point 33c at terminals 26d, an output voltage as shown in FIGURE 4*b* will result. Similarly, as shown in FIGURE 3, each of the voltages appearing at points 27c through 32c is compared with the reference noise voltage appearing at point 33c at terminals 27d through 32d.

It has been found that with oscillator 42 operating at 240 kilocycles, with an output of approximately 13 volts peak-to-peak, and with air gaps between the heads and the disk surface as previously described, an output signal of one volt peak-to-peak voltage is noted when a sensing point is over a raised segment and a zero volt output is noted when a sensing point is over a recessed segment.

As shown in FIGURE 1, heads 26 through 33 appear as stacked individual heads. It is possible to construct these individual heads as one solid block containing eight individual fingers; however, it has been found that a considerable amount of cross talk may occur, i.e., voltage drops may be read across one winding that corresponds to reluctance variations in neighboring fingers. By stacking individual heads, as shown in FIGURE 1, this cross talk is eliminated.

The typical code pattern on the concentric tracks of disk 10 of FIGURE 1 forms no part of this invention. If desired, the code may be a typical binary digital code, or may be any other suitable code. Similarly, it may be desirable to add additional heads and to skew the individual concentric tracks in order to provide any of the anti-ambiguity patterns that are well known in the art.

It should be appreciated that various changes may be made in the invention, without departing from the scope of the invention. For example, disk 10 does not necessarily have to be a disk, but may have any other configuration, such as a linear or cylindrical configuration. By way of further illustration, the recessed and raised portions 22 and 24 may be replaced by segments having different magnetic properties. It is to be understood, therefore, that variations may be made without departing from the scope of the invention. The invention is, therefore, to be limited only as indicated by the scope of the appended claims.

I claim:

1. An analog-to-digital encoder comprising:

(A) a rotatable information member composed of material having a relatively high magnetic permeability and containing on one surface thereof a binary code in the form of raised and recessed segments in said surface, (B) a head composed of material having a relatively high permeability, said head having thereon a relatively thin finger and a relatively thick return section, said finger and said head positioned in close proximity to the coded surface of said information member, and (C) electrical means associated with said finger for generating a magnetic flux path through said finger, said head, said return section, said information member, and said raised or recessed segments, and adapted to respond to the amount of flux passing therethrough.

2. An analog-to-digital encoder comprising:

(A) a rotatable disk composed of material having a relatively high permeability, (B) a plurality of concentric tracks on one surface of said disk, (C) a plurality of raised and recessed segments in each of said tracks, said segments arranged to form a suitable binary digital code, (D) a plurality of heads positioned adjacent said surface of said disk, said heads being composed of material having a relatively high magnetic permeability, (E) a finger on each of said heads, said finger positioned adjacent one of said concentric tracks and in close proximity to said raised segments, (F) a flux return section on each of said heads, said section positioned in close proximity to a plurality of said raised segments and adapted to provide a magnetic flux path through said head, said finger, said raised or recessed segments, said disk and said return section, (G) a winding on said finger adapted to generate magnetic flux through said flux path and further adapted to respond to the amount of magnetic flux passing through said flux path.

3. An analog-to-digital encoder comprising:

(A) a rotatable disk composed of a material having a relatively high magnetic permeability, (B) a plurality of concentric tracks on the surface of said disk, (C) a plurality of raised and recessed segments in each of said tracks, said segments arranged to form a binary digital code, (D) a concentric reference track on the surface of said disk, said reference track having a flat uncoded surface, (E) a plurality of heads positioned adjacent said surface of said disk, said heads being composed of material having a relatively high magnetic permeability, (F) a finger on each of said heads, said finger positioned adjacent one of said concentric tracks and in close proximity to said raised segments, (G) a flux return section on said head, said section positioned at close proximity to a plurality of said raised segments and adapted to provide a magnetic flux path to said head, said finger, said raised or recessed segments, said disk and said return section, (H) a winding on said finger adapted to generate magnetic flux through said flux path and further adapted to respond to the amount of magnetic flux passing through said flux path, (I) circuit means coupled to the winding co-acting with said reference track and with the windings co-acting with each of said plurality of coded tracks for producing output signals indicative of the angular position of said rotatable disk.

4. An analog-to-digital encoder comprising a disk having a plurality of tracks thereon and a plurality of raised and recessed segments in each track, said disk being of a material having relatively high magnetic permeability, a sensing head, a plurality of fingers on said head having narrow tips, said fingers positioned in radial alignment to respective ones of said tracks and in close proximity to the raised segments in said tracks, a large magnetic flux return portion on said head extending the length thereof, said return portion extending over each of said tracks and over a plurality of segments in each of the plurality of tracks, a coil on each of said fingers, and an oscillator connected in parallel to said coils for inducing an alternating current through said coils capable of generating a magnetic flux through said fingers and the surface portion of said disk and back through said return portion.

5. An analog-to-digital encoder comprising an information disk formed of high permeability material and having a plurality of coded tracks thereon formed by a plurality of raised and recessed segments in each track, a reference track in said disk, said reference track being of continuous level therearound, a sensing head, a plurality of fingers on said head, said fingers being positioned in radial alignment to respective ones of said tracks and in close proximity to the raised segments in said tracks, a magnetic flux return portion on said head, said return portion extending over each of said tracks and over a plurality of segments in each of said tracks, a coil on each of said fingers, an oscillator connected in parallel to said coils for inducing an alternating current through said coils capable of generating a magnetic flux through said fingers and said disk, output means connected to said coils adjacent said coded tracks for sensing a voltage drop across said coils created by flux variations due to changes in the angular position of said disk, and said coil adjacent said reference track being connected across said output means for subtracting the constant voltage drop of the coil in alignment with said reference track from each of the other coils.

6. A sensing head for a digital encoder comprising a U-shaped block being of a material having a relatively high permeability to magnetic flux, a plurality of fingers on said head extending the length thereof along one side, each of said fingers being shaped in the form of a chisel point at the end thereof, a coil on each of said fingers and a return magnetic flux portion on said head, said return portion extending the length of said head and being spaced from said fingers, said return portion of said head being substantially greater in width than said fingers.

References Cited by the Examiner

UNITED STATES PATENTS

| | | | |
|---|---|---|---|
| 2,938,198 | 5/1960 | Berman et al. | 340—347 |
| 2,975,409 | 3/1961 | Petherick | 340—347 |
| 3,051,943 | 8/1962 | Simon et al. | 340—347 |

MALCOLM A. MORRISON, *Primary Examiner.*

L. W. MASSEY, A. L. NEWMAN, *Assistant Examiners.*